May 15, 1945.   W. C. HUNGERFORD   2,375,789
MILLING MACHINE ATTACHMENT FOR LATHES
Filed Jan. 4, 1939   2 Sheets-Sheet 1
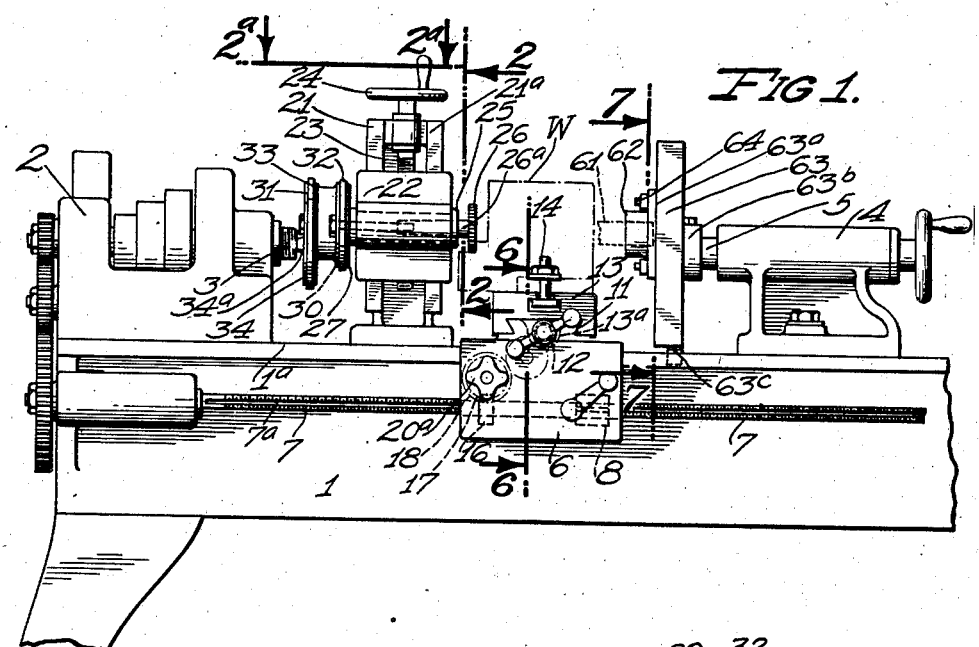
INVENTOR.
WILLARD C. HUNGERFORD
BY
ATTORNEY

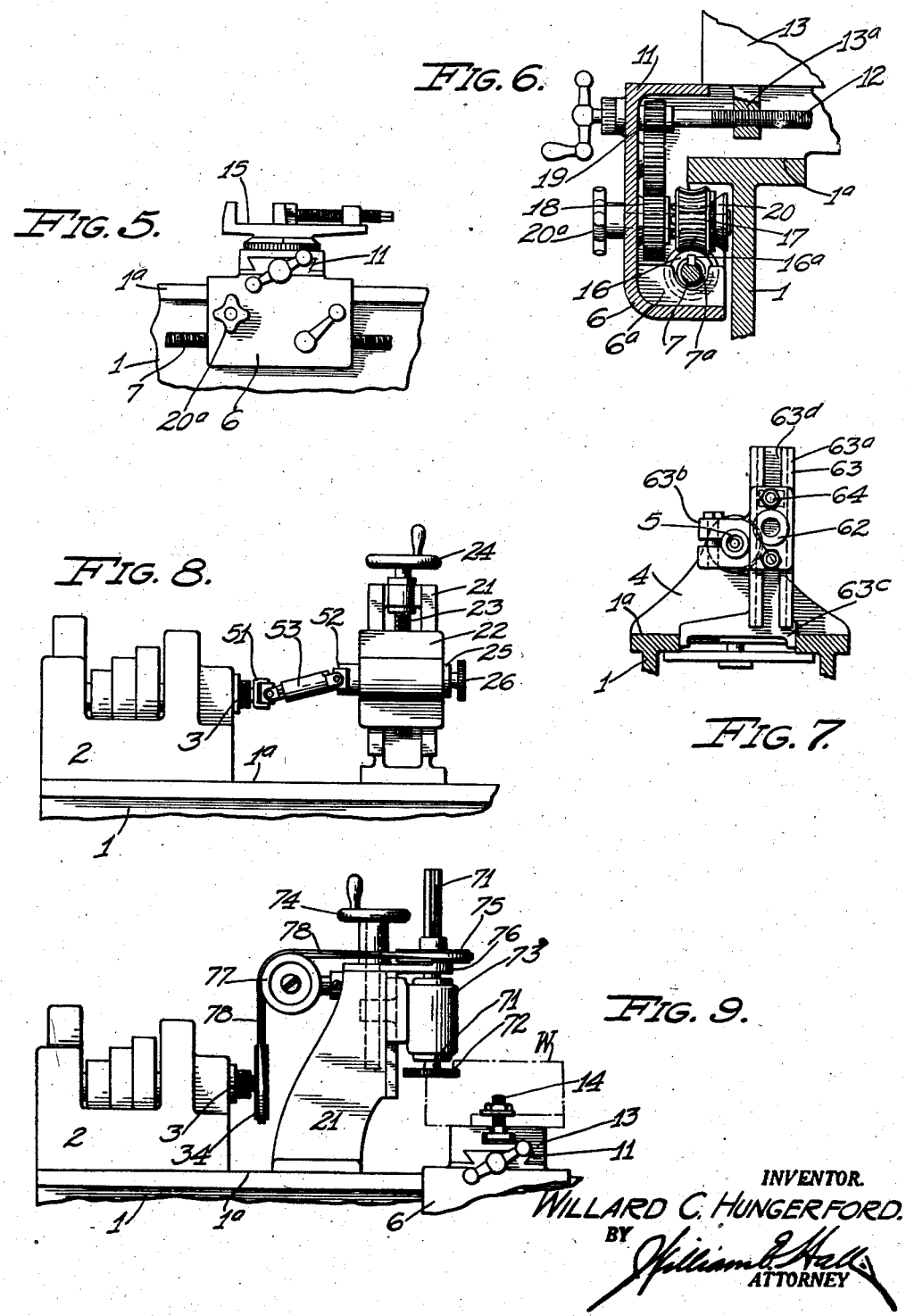

Patented May 15, 1945

2,375,789

UNITED STATES PATENT OFFICE 2,375,789

MILLING MACHINE ATTACHMENT FOR LATHES

Willard C. Hungerford, Los Angeles, Calif.

Application January 4, 1939, Serial No. 249,223

14 Claims. (Cl. 90—11)

My invention relates to a milling machine attachment for lathes.

One of the principal objects of this invention is to provide an attachment of this class which is particularly simple and economical to make, which may be easily and quickly installed without the least mutilation of the lathe, and which is simple to operate.

Another important object of this invention is to provide an attachment of this class for a conventional lathe whereby, the combination may provide and simulate as nearly as possible the several adjustments of the conventional milling machine, and whereby the conventional lathe adjustments are utilized and only one adjustment supplied by my attachment.

An object of my invention is to provide an attachment whereby the work, to be operated on, may be rigidly supported by and secured to the adjustable lathe carriage, and whereby the attachment will supply the vertical adjustment of the cutter or other tool for the required operation on the work.

An object also of this invention is to provide a vertically adjustable cutter or tool which is detachably operatively connected to the headstock spindle of the lathe, and in which the connection is flexible and efficient.

A further object of this invention is to provide a novel, simple, and efficient means of mounting an idler roller for taking up the slack of the driving belt when operating in either direction.

A still further object of this invention is to provide novel and simple means of supporting on the tailstock spindle, or guiding by means of such spindle, the free end of a long cutter arbor of the attachment.

Also an object of this invention is to provide a very simple means of easily and quickly connecting an attachment of this class to the headstock spindle of the lathe, and also for easily and quickly removing the same from such spindle.

With these and other objects in view as will appear hereinafter, I have devised a milling machine attachment for lathes and one which consists in certain novel features of construction, combination, and arrangement, of parts and portions, as will be hereinafter described in detail and particularly set forth in the appended claims, reference being had to the accompanying drawings and to the characters of reference thereon, which form a part of this application, in which:

Fig. 1 is a fragmentary front elevation of a lathe on which my milling machine attachment is installed;

Fig. 2 is a fragmentary elevation thereof;

Fig. 2ª is a fragmentary view in plan, taken at 2ª of Fig. 1;

Fig. 3 is an enlarged sectional view showing particularly the means for taking up the slack, in a slightly modified form;

Fig. 4 is a sectional view thereof taken through 4—4 of Fig. 3;

Fig. 5 is a fragmentary front elevation showing a work-holding vise on the cross-feed of the lathe;

Fig. 6 is an enlarged section, taken at 6—6 of Fig. 1, showing the operative connection between the cross-feed and the lead screw of the lathe;

Fig. 7 is an elevational view, partly in section, of the out-board bearing of the cutter arbor; and, Fig. 8 shows a modified connection between the headstock spindle and the cutter spindle; and, Fig. 9 is a fragmentary front elevation of my attachment in a slightly modified form of construction.

The lathe upon which my milling machine attachment is to be applied is preferably of the type, commonly known as the engine lathe. This lathe, as shown in the drawings, comprises a bed 1, a headstock 2, a headstock spindle 3, a tailstock 4 which is slidably mounted on the bed, a tailstock spindle 5 adjustably mounted in the tailstock, a carriage 6 slidably mounted on the ways 1ª of the bed between the headstock and the tailstock. The usual lead screw 7 may be connected, through the split collar 8, to the carriage for automatically shifting the carriage on the ways of the bed.

On the carriage 6 are ways 11, extending crosswise of the lathe, upon which the cross-feed carriage of the lathe is usually mounted, and which may be automatically moved crosswise by a cross-feed screw 12. In my attachment I have provided a work-supporting table 13 which is slidably mounted on the ways 11 and which is provided with a downwardly extending lug 13ª through which the cross-feed screw 12 extends for moving the work-supporting table crosswise of the lathe. This table 13 is provided at the upper face with T-slots. On this table is supported the work W which is to be machined or otherwise operated on, and which is held in place on the table by T-bolts 14.

In Fig. 5 I have shown a vise 15 which may be supported on the ways 11 in place of the usual angle feed, or compound rest, so that the desired work may be held by the vise and turned in the angular position desired.

On the table 13 may also be supported the usual dividing head and corresponding center bracket, as used on the conventional milling machine table, and which are not here illustrated.

In order to provide automatic cross-feed operation of the work supporting table 13, or vise 15, the screw 12 is operatively connected to the lead screw 7. In the usual lathe, this is done through a worm 16 which is longitudinally slidable but non-rotatably mounted on the lead screw. The worm may be shifted with the carriage 6 by portions 6a at the opposite sides of the worm. This worm has a key 16a which slides in a keyway 7a of the screw 7. A worm gear 17 meshes with the worm. A gear 18 is operatively connected, in any suitable manner, to a gear 19 on the cross-feed screw 12. The gears 17 and 18 are coaxial and are connected together by a clutch 20, which may be manually operated by a hand wheel 20a from the front of the apron of the carriage 6.

In my milling machine attachment, I have provided a bracket 21 which is supported on the lathe bed 1 between the headstock 2 and the carriage 6, and aligned by the ways 1a on the bed. This bracket 21 is preferably secured to the bed in a convenient manner, such as usually employed in securing the tailstock to the bed. The bracket 21 extends upwardly from the bed and has vertical ways 21a upon which the cutter spindle carriage 22 is mounted. This cutter spindle carriage is raised and lowered by means of a manually adjustable screw 23 having a hand wheel 24 at its upper end. This carriage carries a horizontal spindle 25 which is parallel to the center axis line of the lathe. This spindle 25 is mounted to be raised and lowered below and above the headstock spindle axis and may be positioned in front of or backwardly from the vertical plane passing through the headstock spindle axis, but preferably in front of the same, as shown. On the end of the cutter spindle 25 nearest the lathe carriage 6, is mounted the desired tool or cutter 26. On the opposite end of the cutter spindle is a sheave 27 for operating the cutter spindle.

On the bracket 21 is an adjustable backwardly but upwardly extending arm 28 which carries a counter shaft or axle 29 having rotatably mounted thereon a pair of sheaves 30 and 31, secured together as a unitary member, the former being coplanar with the sheave 27. These sheaves 27 and 30 are connected by a V-belt 32. The sheave 31 is connected by a belt 33 with a sheave 34 which is mounted on the extended end of the headstock spindle 3. Thus, the revoluble movement of the headstock spindle is transmitted through the several sheaves and belts to the cutter spindle 25.

It will be noted that the sheave 34 has a coaxial tapered shank 34a so that it may be readily secured to the spindle by merely inserting the shank in the tapered center recess thereof.

In order to maintain the belts 32 at all times in a taut condition, I have provided an idler roller 35 which is mounted on an arm 36 pivoted on the shaft or axle 29, as shown. On the arm 28 and around the axle 29 is provided a coil spring 37 which bears against the arm 36 for forcing the same against the belt 32.

The mechanism is so arranged that when the direction of rotation of the spindle 25 is reversed, the roller 35 automatically shifts to the side of the upper portion of the belt and drops upon the lower portion, and in this manner keeps the belt taut, as shown by dotted lines in Fig. 2.

In Fig. 3 of the drawings I have shown a belt tightening means comprising primarily also a roller 35 at the end of an arm 36. But between the hub of the arm 36 and the sheave 30 is a friction washer 38. The sheave 30 and the arm 36 are resiliently forced together by a spring 39 placed between the sheave 31 and a nut 29a at the outer end of the axle 29. As the sheave is rotated in one direction or the other, the arm 36 is rotated in the same direction and the roller at the end of the arm is forced to engage the corresponding portion of the belt.

If desired spring means may be provided to force the roller more tightly against the belt. This spring means may consist of two springs 40 and 41 connected at one end to the side of the arm 28. The outer ends of the springs are connected to one end of the dogs 42 and 43, respectively. These dogs are pivoted at the opposite edges and transversely to the pivotal axis of the arm 28 through longitudinal slots intermediate the ends of the dogs. The springs hold the dogs in either of two positions. When the arm 36 swings from the bottom to the top, it is forced hard against the short arm 43a of the dog 43, accentuated by the fact that the belt at the lower side is suddenly straightened which gives the arm 36 an initial thrust to swing it in its other extreme position, and thus causing it to be forced into the position shown. It then strikes the longer normally inner arm and causes it to rotate and assume the position shown in Fig. 4. The spring 40 will draw it inwardly by reason of the slot and resiliently hold the roller 35 against the upper portion of the belt 32.

In Fig. 8 of the drawings, I have shown a slightly modified form of construction for operating the cutter spindle 25 by the headstock spindle 3. The modified structure consists of universal joints 51 and 52 connected respectively to the headstock and cutter spindles, and a telescoping rod 53 connecting the universal joints. Such modified structure, however, is not as effective because the cutter spindle supporting bracket 21 cannot be placed very close to the headstock, and therefore does not permit as much operating space between the cutter 26 and the work W on the lathe carriage.

If, instead of the short cutter spindle 25, a long cutter spindle or arbor 61 is employed, the free end of the arbor is supported in a transversely adjustable arbor journal 62, which is preferably constructed to receive the whole of the free end of the arbor. This journal is slidably mounted on a vertical slide 63a of a bracket 63. As shown in the drawings, this bracket is frictionally clamped, by a split clamp 63b, to the extended portion of the tailstock spindle 5. The slide 63a extends preferably in a vertical direction, and the lower end is guided, preferably by a bifurcated arm 63c, on the ways 1a of the lathe bed. In this manner, the bracket 63 may be adjusted, longitudinally of the lathe, by the tailstock spindle. The journal 62 is secured to the face of the slide portion 63a by T-bolts 64. These bolts are preferably loosely fitted in a T-slot 63d so as to provide ready vertical adjustment to accommodate slight misalinement of the tailstock with respect to the cutter arbor. The journal 62 is then secured by the T-bolts.

The cutter 26, and also the cutter arbor 61 (that is, if a cutter arbor is used independently of the spindle 25), have tapered shanks 26a whereby they may be readily secured to the spindle 25. In this manner, the arbor 61 may be readily raised and lowered with the cutter spindle 25, that is, if the arbor journal 62 is loose on the bracket 63.

In Fig. 9 of the drawings, I have shown the cutter spindle and cutter, designated respectively, 71 and 72, arranged on a vertical axis, and also mounted to slide in a vertical direction. The spindle is mounted in a bracket 73, which, in this instance, is positioned at the side of the supporting bracket 21, opposite the headstock, instead of in front of the same as in the structure described above. The carriage 73 is raised and lowered in a similar manner by a hand wheel 74 at the top of the bracket 21. This bracket carries a sheave 75, co-axial with the spindle 71, and is mounted on an arm 76. At the side of the bracket 21 nearest the headstock is a pair of coaxial idler sheaves 77 mounted on an axis transverse to the cutter spindle. In this instance, the headstock spindle also has a sheave 34. A V-belt 78 extends around the sheaves 34 and 75 and over the idler sheaves 77 for transmitting a horizontal rotation to a vertical rotation of the cutter spindle. The upper end of the cutter spindle is splined with respect to the sheave 75 so that it may be freely raised and lowered while being rotated.

The work W, upn which the cutter 72 may operate, is supported in the manner described above.

Though I have shown and described a particular construction, combination, and arrangement, of parts and portions of my milling machine attachment for lathes, and certain modifications thereof, I do not wish to be limited to the same, but desire to include in the scope of my invention the construction, combination, and arrangement, substantially as set forth in the appended claims.

I claim:

1. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, a cutter arbor revolubly mounted on the latter carriage, means operatively connecting the cutter arbor to the headstock spindle in such a manner that the cutter arbor may be freely adjusted vertically, a second bracket supported with respect to the tailstock spindle, and having a transverse guide with an adjustable arbor bearing slidably mounted in the guide for supporting the free end of the arbor, and a cutter on the cutter arbor for operating on the work supported on the lathe carriage.

2. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, a cutter arbor revolubly mounted on the latter carriage, means operatively connecting the cutter arbor to the headstock spindle in such a manner that the cutter arbor may be freely adjusted vertically, a second bracket clamped to the tailstock spindle, and having a transverse guide with an adjustable arbor bearing slidably mounted in the guide for supporting the free end of the arbor, and a cutter on the cutter arbor for operating on the work supported on the lathe carriage.

3. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, a cutter arbor revolubly mounted on the latter carriage, means operatively connecting the cutter arbor to the headstock spindle in such a manner that the cutter arbor may be freely adjusted vertically, a second bracket supported with respect to the tailstock spindle, and slidably guided on the bed, and having a transverse guide with an adjustable arbor bearing slidably mounted in the guide for supporting the free end of the arbor, and a cutter on the cutter arbor for operating on the work supported on the lathe carriage.

4. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a bracket securable to the bed of the lathe between the headstock spindle and the carriage, a cutter supporting carriage vertically slidably on the bracket, means for vertically adjusting the latter carriage, a cutter arbor revolubly mounted on the latter carriage, a sheave on the headstock spindle, a sheave on one end of the cutter spindle, a counter shaft carrying a pair of sheaves, a belt connecting one of said pair of sheaves with the headstock spindle sheave, a second belt connecting the other of said pair of sheaves with the cutter spindle sheave, an idler sheave for tightening the latter belt, a second bracket supported with respect to the tailstock spindle, and having a transverse guide with an adjustable arbor bearing slidably mounted in the guide for supporting the free end of the arbor, and a cutter on the cutter arbor for operating on the work supported on the lathe carriage.

5. In a milling machine attachment for lathes, the combination with a lathe having a bed, a headstock spindle at one end of the bed, a bracket securable to the bed of the lathe adjacent the headstock spindle, a cutter carriage vertically slidable on the bracket, means for vertically adjusting the latter carriage, a cutter spindle revolubly mounted on the latter carriage, a sheave on the headstock spindle, a sheave on one end of the cutter spindle, a counter shaft carrying a pair of sheaves, a belt connecting one of said pair of sheaves with the headstock spindle sheave, a second belt connecting the other of said pair of sheaves with the cutter spindle sheave, an idler sheave for tightening the latter belt, and a cutter on the cutter spindle for operating on the work supported on the lathe carriage.

6. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a cutter arbor revolubly supported on the bed on an axis parallel to the headstock spindle and operatively connected to the latter spindle, and a bracket supported with respect to the tailstock spindle, and having a transverse guide with an adjustable arbor bearing slidably mounted in the guide for supporting the free end of the arbor.

7. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a cutter arbor revolubly supported on the bed on an axis parallel to the headstock spindle and operatively connected to the latter spindle, and a bracket clamped to the tailstock spindle, and having a transverse guide with an adjustable arbor bearing slidably mounted in the guide for supporting the free end of the arbor.

8. In a milling machine attachment for lathes, the combination with a lathe having a bed, a headstock spindle at one end of the bed, a tailstock spindle, and an adjustable carriage movably mounted on the bed, of a work supporting means mountable on and adjustable by the carriage, a cutter arbor revolubly supported on the bed on an axis parallel to the headstock spindle and operatively connected to the latter spindle, and a bracket supported with respect to the tailstock spindle, and slidably guided on the bed, and having a transverse guide with an adjustable arbor bearing slidably mounted in the guide for supporting the free end of the arbor.

9. In a milling machine attachment for lathes, the combination with a lathe having a bed, a headstock spindle at one end of the bed, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, a cutter arbor rigidly supported at one end and revolubly mounted on the latter carriage, means operatively connecting the cutter arbor to the headstock spindle in such a manner that the cutter arbor may be freely adjusted vertically, a second bracket supported on the bed at the side of the carriage opposite the first bracket, the second bracket having a transverse guide with an adjustable arbor bearing slidably mounted in the guide for supporting the free end of the arbor, and a cutter on the cutter arbor for operating on the work supported on the lathe carriage.

10. In a milling machine attachment for lathes, the combination with a lathe having a bed, a headstock spindle at one end of the bed, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, said carriage having a tapered-shank-receiving bore, a cutter arbor having a tapered shank fitting in said bore, said arbor being thereby revolubly mounted on the latter carriage, means operatively connecting the cutter arbor to the headstock spindle in such a manner that the cutter arbor may be freely adjusted vertically, a second bracket supported on the bed at the side of the carriage opposite the first bracket, the second bracket having a transverse guide with an adjustable arbor bearing slidably mounted in the guide for supporting the free end of the arbor, and a cutter on the cutter arbor for operating on the work supported on the lathe carriage.

11. In a milling machine attachment for lathes, the combination with a lathe having a bed, a headstock spindle at one end of the bed, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter on the bracket, means for vertically adjusting the latter carriage, a cutter arbor rigidly supported at one end and revolubly mounted on the latter carriage, means operatively connecting the cutter arbor to the headstock spindle in such a manner that the cutter arbor may be freely adjusted vertically, a second bracket supported on the bed at the side of the carriage opposite the first bracket, the second bracket having a transverse guide with an adjustable arbor bearing freely slidably mounted in the guide for receiving therein and for supporting the free end of the arbor, means for rigidly securing the bearing on the guide, and a cutter on the cutter arbor for operating on the work supported on the lathe carriage.

12. In a milling machine attachment for lathes, the combination with a lathe having a bed, a headstock spindle at one end of the bed, and an adjustable carriage movably mounted on the bed, of a work supporting means mountable on and adjustable by the carriage, a bracket securable to the bed of the lathe between the headstock spindle and the carriage, a cutter supporting carriage vertically slidable on the bracket, means for vertically adjusting the latter carriage, said carriage having a tapered-shank-receiving bore, a cutter arbor having a tapered shank fitting in said bore, said arbor being thereby revolubly mounted on the latter carriage, means operatively connecting the cutter arbor to the headstock spindle in such a manner that the cutter arbor may be freely adjusted vertically, a second bracket supported on the bed at the side of the carriage opposite the first bracket, the second bracket having a transverse guide with an adjustable arbor bearing freely slidably mounted in the guide for receiving therein and for supporting the free end of the arbor, means for rigidly securing the bearing on the guide, and a cutter on the cutter arbor for operating on the work supported on the lathe carriage.

13. In combination with a lathe having a bed, a headstock mounted thereon and a drive spindle rotatably carried by the headstock, a milling device comprised of a body mounted on the bed, a carriage mounted on the body, a tool carrying spindle journalled in the carriage on a longitudinal axis parallel to that of the drive spindle, said carriage being slidably mounted on the body whereby to permit vertical adjustment thereof with respect to the longitudinal axis of the drive spindle, means establishing an indirect drive connection between the drive spindle and tool carrying spindle, said means including a countershaft whose longitudinal axis is parallel to but offset from the longitudinal axis of the drive spindle, means operatively connecting the drive spindle to the countershaft, and means operatively connecting the countershaft to the tool carrying spindle.

14. In a milling machine attachment for lathes, the combination with a lathe having a bed, a headstock spindle at one end of the bed, a bracket securable to the bed of the lathe adjacent the headstock spindle, a cutter carriage vertically slidable on the bracket, means for vertically adjusting the latter carriage, a cutter spindle revolubly mounted on the latter carriage and positioned parallel to the headstock spindle, a sheave on the headstock spindle, a sheave on one end of the cutter spindle, a counter shaft carrying a pair of sheaves and also positioned parallel to the headstock spindle, a belt connecting one of said pair of sheaves with the headstock spindle sheave, a second belt connecting the other of said pair of sheaves with the cutter spindle sheave, an idler sheave for tightening the latter belt, and a cutter on the cutter spindle for operating on the work supported on the lathe carriage.

WILLARD C. HUNGERFORD.